Jan. 12, 1943.  N. P. HARSHBERGER  2,308,173
PROCESS OF MAKING BUILDING MATERIAL
Original Filed Aug. 7, 1934
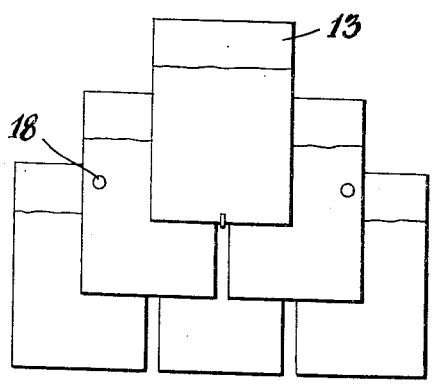
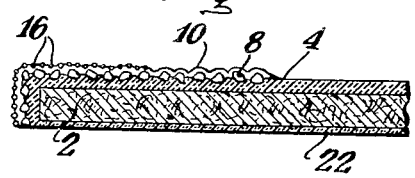
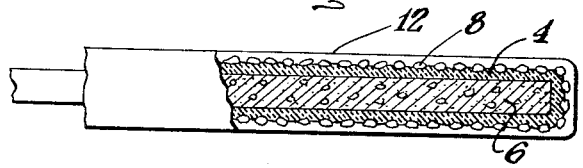
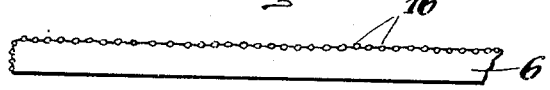
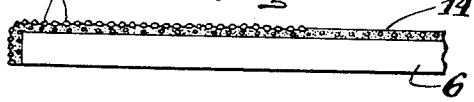
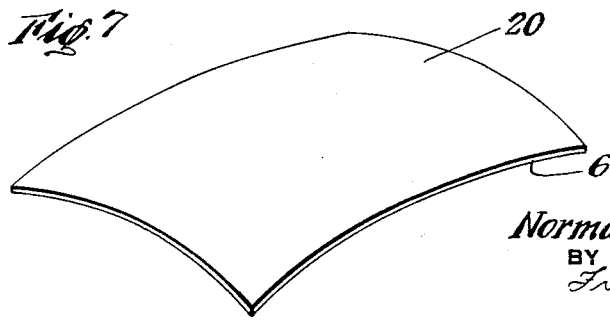
INVENTOR
Norman P. Harshberger
BY
Fred. W. Dodson,
ATTORNEY Patented Jan. 12, 1943

2,308,173

UNITED STATES PATENT OFFICE 2,308,173

PROCESS OF MAKING BUILDING MATERIAL

Norman P. Harshberger, Scarsdale, N. Y., assignor, by mesne assignments, to Carbide and Carbon Chemicals Corporation, New York, N. Y., a corporation of New York Original application August 7, 1934, Serial No. 738,875. Divided and this application July 23, 1937, Serial No. 155,171

7 Claims. (Cl. 18—60)

This invention relates to processes of making building elements intended for exposure to weather and for that purpose provided with a surface that may be a coating or in some instances may be the surface of the base material itself, that will be resistant to deterioration by weather, and is a division of my copending application, Serial No. 738,875 filed August 7, 1934, now Patent No. 2,096,242 granted October 19, 1937, and is a continuation-in-part of my copending application Serial No. 643,891 filed November 22, 1932, now Patent No. 2,044,786 granted June 23, 1936. The base may be wood, cement-fibre and/or bitumen or resin, felt obtained from animal, mineral or vegetable fibres, paper, etc., or various compositions including them. The invention is of general application but because it more particularly relates to materials intended for roofing, the description which follows will be specifically addressed to the embodiment of the invention.

In the roofing industry it has been customary to employ the ordinary Portland cements in the making of cement-asbestos shingles and I have found such materials useful as a coating in a composite structure including a saturated fibrous base, a bituminous adhesive coating and a layer of granular particles therein to grip the cement coating. Portland cements in these uses have, however, been conducive to certain undesirable effects. In order to substantially retard these effects, additional processing and handling of the products has been necessary.

A particularly undesirable effect is the common blemish or efflorescence of the cement surface resulting in certain instances from the liberation of calcium salts or calcium hydroxide to the surface of the cement where they react with the carbon dioxide in the air to form a deposit of crystals of calcium carbonate. This action is not only evident in freshly formed cement surfaces but continues to appear over a long period of time as the cement ages. It is particularly undesirable where the surface is other than white in color as it not only discolors the cement surface itself but also affects the cement coloring matter. Various treatments have been resorted to in an attempt to retard this action. These have included the addition of, or surface washing, with chemicals and/or repeated surface treatment by accelerating agents to bring the blemishing materials to the surface, after which they are scrubbed off. Obviously this has involved considerable processing and at best the methods employed have not been productive of a complete barrier to further scum action. Dusting efflorescence has also been a factor in the making of these roofing products but in shingles of the character to be described such is believed to have been overcome by curing in stack formation before the cement has set. In addition, it has been found that the Portland cements heretofore used take a considerable period to cure and harden, thus not adapting them for rapid turnover in manufacture and sales and show, moreover, early signs of wear under weather exposure, particularly in the low spots of a roughly textured surface where the cement composition serves as a coating. Also, cements of this character change volume and contract upon drying for a long period after setting and this contributes to the possibility of formation of surface cracks in units secured to a weather surface. In fact, it is also believed that this action of such Portland cements contributes to the curling action in shingles of a cement-asbestos structure. Furthermore, cements of this character, having free lime or liberating their salts or hydroxide to the surface, have not been the best for metal fasteners such as nails, even though galvanized. The salts readily aid in destroying such fasteners and the action of the salts upon the metal fastening means contributes substantially to the staining of the cement surfaces.

In accordance with the present invention, the foregoing objections relative to cementitious shingles are overcome to a marked degree, in fact, it is believed that in most instances they are eliminated. The invention provides shingles with a hydraulic cementitious weather-wear surface that has the characteristic of requisite strength and hardness to withstand exposure to weather and temperature changes, as well as a high degree of freedom from efflorescence from the soluble salts liberated upon exposure. The composition used is further adapted to provide a surface having an erosion resistance greater than prior materials employed therefor, since the composition used, upon hardening, provides a denser surface than the prior materials. Also the composition has the added quality of hardening more rapidly than previous materials employed for the purposes herein contemplated, thereby providing the product with substantially full strength after a short period of cure. This enables the application of the product to a weather surface within a short period, which may be within 24 hours of its fabrication, and further, where the composition serves as a coating, penetration of and driving home of securing means such as nails, without causing squashing of the cement surface, is fully possible after such a short period. It has also been found that the composition employed in the present invention has less effect than the usual cement upon metal, particularly galvanized nails or galvanized flashings with which the material comes into contact. This is not true of Portland cements, since there is a constant reaction between the lime therein and the zinc coating upon the surface of the metal which aids in bringing about corrosion. Moreover, upon the roof where the composition of this invention serves as a coating for an asphalt base unit, there is less likelihood of a chemical action between the composition and the asphalt of the base than would occur were the composition of Portland cement.

A particular feature of the present invention resides in the improved relation obtained between the cement composition of the invention and coloring pigments over that heretofore obtained with Portland cements. Whereas, colored Portland cements employing mineral oxides for coloring pigments lose color and/or discolor in spots due to lime action in such cements liberating a bloom or affecting the tinctural value of the pigments, which action continues for a considerable period in the aging of the cement, and/or lose color through what is believed to be the continuous action of the soluble silicates in Portland cement reacting and affecting the color pigments and also coming to the surface, the composition employed in this invention is believed to avoid this action entirely, with the result that the coloring is unaffected by the composition itself. It has been further found after considerable experimentation that certain coloring agents heretofore not believed useful with cements are satisfactory in the composition of the invention, for instance, whereas, Portland cements will bleach out the color in an ultramarine blue, such color as well as others of a similar character remains unaffected in the composition employed in this invention. It has also been found that the use of the composition of this invention as a coating over a bitumen and/or resin-containing web results in certain process advantages. The crystallizing action of the composition takes place much more rapidly than ordinary Portland cement and the temperature rise due to the reaction is greater. Thus when the composition is applied to a thermoplastic base, for instance, as asphalt coated web, the composition, to an appreciable extent, anneals the thermoplastic base and permits the assembly to adjust stresses as the thermoplastic base and the composition harden.

Additional objects of the invention reside in the provision of additions to the composition of the invention to quicken its set in order to prevent "framing" of the surface which sometimes takes place a short distance within the edges of the units under certain conditions of stacking and curing of the shingles, and another object resides in the incrustation of a dry mix of the composition over the wet surface of the prepared product to effect a harder and less porous facing and particularly where the surface is dotted with high and low areas to insure a wearing surface in the low areas of equal character to that obtained in other portions of the surface.

Coating or body compositions for the purpose of this invention comprise, as to the cementitious ingredients, high alumina cements, carrying usually between 60 to 95 per cent of calcium aluminates or calcium alumina ferrites, particularly those made by fusion, and when properly so made, entirely free of free lime. It is, however, contemplated by reason of color, though not preferred, to also employ high alumina cements not necessarily made by fusion, which may also include quantities of free lime which, however, have been substantially converted into such products as calcium carbonate in their making as not to react unfavorably for the purposes herein set forth. I have found that a high alumina cement having the following analysis is in general satisfactory:

| | Per cent |
|---|---|
| Silicon dioxide ($SiO_2$) | 6.3 |
| Oxide of iron ($Fe_2O_3$) | 15.4 |
| Aluminum oxide ($Al_2O_3$) | 38.1 |
| Titanium oxide ($TiO_2$) | 2.2 |
| Calcium oxide (CaO) | 36 |
| Magnesium oxide (MgO) | 1 |
| Sulfur trioxide ($SO_3$) | .2 |
| Insoluble residue | .6 |

The composition may be varied to allow for differences in process and raw materials and their accessibility in the various localities, providing, however, that the processes and materials employed lead to a product of the quality herein contemplated.

The composition may also include extending materials and, when combined with a proper amount of water and/or other liquids, is such as to yield a hard and dense surface. The extending materials may include coarse and/or fine aggregates, for instance, marble dust, diatomaceous earth, crushed cement rock, crushed slag, sand, crushed glass, long or short fibres of mineral, animal or of vegetable character, such as asbestos, cotton linters or hair; coloring agents, for instance, colored mineral oxides or dyes, dry blood, and/or an acid, for instance, sulphuric acid (which has the property of effecting changes in shade of color) and, waterproof and adhesive substances such as asphalt which may be an emulsified asphalt and/or natural or synthetic resins which may be oil compositions. These may be mixed with the cement in such proportions as the character and the requirements of the products to be made will allow. The amount of liquid should be carefully controlled to insure proper hydration. Such will depend somewhat upon the type of mix and will readily be determined in actual practice. A water cement ratio of about .9 has been found in many instances to be satisfactory. As previously set forth in the objects of the invention, the cement composition is admirably adapted to combine with pigments to yield color surfaces which do not become lifeless in subsequent exposure but retain their color quality due to the novel character of the cement composition which resides in being substantially free from the undesirable lime efflorescence that ordinarily not only affects coloring ingredients but also deposits a scum upon the surface to destroy its character. I have also found that the composition is highly resistant to acidic influences and well resists the acids in the atmosphere. The composition is well adapted for use in cold or hot climates without protection, and moreover is such that a rapid set and rapid hardening may be effected in a short period after mixing with the liquid ingredient, yet the composition develops a strength higher than prior materials used for the purposes herein described. Because of this, and because the cement ingredient of the composition effects greater strength in a product including an aggregate than when used in neat form, leaner mixes than customarily employed may be used.

In order to prevent "framing" in the stack in curing my shingles, which effect occurs a short distance in from the shingle edges and is believed to represent a point of balance between $CO_2$ in the air surrounding the stack and the water content of the surface from the edges inwardly or a point of balance between the relative humidity of the surroundings and the cement surface, I have found that quickening the set of the composition overcomes this tendency. After considerable experimentation I have found that calcium sulfate in the form of gypsum or plaster of Paris (commercial grade), in amounts of approximately 2%, produces satisfactory results. This amount may be varied according to the conditions of set-acceleration desired and according to the type of and proportion of aggregates included in the cement, but care should be exercised not to include such amounts as will materially affect the character of the finished product. It should be noted that gypsum would not be expected to produce this result since it is a common ingredient in Portland cement where it produces an opposite effect, that of retarding the set of such materials.

The composition of the invention may be used in the making of numerous articles of manufacture of which interior and exterior tiles and boarding, roofing and siding materials, and flooring, are by way of examples. However, the instant disclosure is particularly directed to roofing materials such as individual or strip shingling having straight or serrated weather exposed edges and which are usable for roofs and sides of buildings.

Certain features of the invention relating to the improved composition and structures have been described above and others thereof will in part be obvious and in part be apparent from the subsequent description and accompanying drawing wherein certain constructions are shown for the purpose of illustration, it being understood, however, that the invention may be applied to other forms of the contemplated products than are disclosed.

In the drawing

Fig. 1 is an assembly of shingle elements made in accordance with the invention;

Fig. 2 is a sectional view of a form of a shingling material for which the cement composition of the invention may be utilized;

Fig. 3 is an enlarged section through shingling material in which there is a thorough coating of the composition;

Fig. 4 is a partial sectional view of a portion of shingling material showing a thick coating of the composition applied to both sides and edges of a base;

Fig. 5 is a form of the invention in Fig. 2;

Fig. 6 is a sectional view of another form of the shingling material of Fig. 2; and Fig. 7 is a perspective view of a shingle element to which the composition may be applied.

In carrying out the method of making shingling material according to the invention, a continuously moving composition sheet or web is preferably formed and cut as desired into pieces to form bases, though it is within the scope of the invention to make such bases from pressed sheets or individually molded or formed ones. Such sheet or web, which in one form of the invention may be a base 2 for a composite structure, can be made by providing a web of a flexible fibrous material, for instance, a base made from animal, vegetable or mineral fibres, for instance, vegetable fibres, asbestos, paper, wool or hair, alone, in combination, or with other filling or extending materials, and treating the web to resist water and decay by saturating it with a suitable substance, for instance, a low melting point asphalt which may include resinous fillers comprising natural resins or synthetic resins or which may be such materials alone, and thereafter applying to one or more sides and edges and additional coating adhesive 4, for instance, a high melting point bituminous material or one including, or of the type of, the aforementioned resinous materials. The sheet or web may, however, comprise a structure of cement and any of the aforementioned fibres in which the composition of the invention may be the cementitious portion and when so made, such a base 6 may in itself be a finished product. This type of base may also include water repellent agglutinants, additions or saturants, such as asphalt, which may be in an emulsified form, natural or artificial resins, which will provide the base with water resistance and resistance to shock and will provide adhesive character to the plastic base in fabrication, adapting the structure to one of a relatively thin section that may possess a substantial degree of flexibility when hardened.

Where I desire to obtain a firm hold on the adhesive layer and to present a structurally adapted surface for the further application of the composition of the invention as a coating, I may apply or bond to the surface of the base on one or more faces and over any portion thereof before the adhesive has set a roughening material 8 which may be granular particles, for instance, mineral particles of slate, stone, sand, glass, brick, shale, slag, asbestos fibre and/or other materials as granulated cork, vermiculite, hair, etc. The particles described are partially embedded in the adhesive coating by the usual roofing practices and it can be appreciated that due to their irregular outlines the adhesive will secure a firm hold upon them and where the particles are porous will in addition fill their cavities to provide additional grip. Thereafter I apply a coating, which may be thin as at 10, Fig. 3, or thick as at 12, Fig. 4, of the composition of the invention. I have found that compositions of which the following are examples, are satisfactory for this use:

EXAMPLE 1

*Plain coating*

| | Per cent |
|---|---|
| Long fibred asbestos | 1 |
| High alumina cement | 33 |
| Marble 20/40 mesh | 66 |

EXAMPLE 2

*Blue black*

| | Per cent |
|---|---|
| Long fibred asbestos | 1 |
| Marble 20/40 mesh | 60½ |
| Liquid (black coloring) | 5½ |
| High alumina cement | 33 |

EXAMPLE 3

*Red*

| | Per cent |
|---|---|
| Long fibred asbestos | 1 |
| Marble 20/40 mesh | 56 |
| Red oxide | 10 |
| High alumina cement | 33 |

Example 4

Green

| | Per cent |
|---|---|
| Long fibred asbestos | 1 |
| Marble 20/40 mesh | 60 |
| Green oxide | 6 |
| High alumina cement | 33 |

In the above examples where it is desired to obtain, as previously described, a quick setting cement, 2% of gypsum or plaster of Paris (commercial grade) may be substituted for an equal amount of the cementitious component or the cementitious component may have such quickening ingredient ground into it during its manufacture.

The composition as aforementioned may be of natural color and it may be applied forcibly or otherwise over the face of the web, sheet or individual base, and either runs, grips by virtue of a spray action or may be rolled into the spaces between the surface roughening layer and into the irregular crevices where such material is of a porous nature, so that when it sets and hardens a cementitious bond exists between such layer and the coating, and in which the coating and the adhesive material to which the particles were initially applied will be attached to said particles to produce a structural anchorage therefor. If in the form of a web, it is cut into shingle sizes 13 before or after coating and may be immediately stacked for curing and permitted to cure until used. In the process described the coating may be a thin one, partially filling the interstices between the anchoring particles and where desired providing a thin film over the peaks of the particles, or the coating may completely cover the particles to any desired thickness. Further coatings may be applied before or after the described cutting operation and the coating may be applied to a portion of the sheet, to the edges thereof, or to both sides and edges, as desired. The coated bases are stacked in a compact grouping with adjacent pieces in face to face relation before the plastic coatings have set, and are cured while so stacked.

Ornamental effects may be obtained by forming impressions in the coating or by operating upon the base prior to its receiving the coating as to form a plurality of depressed areas or spaced apart indentations to form designs or lines of demarcation as desired. Where the base particles are of a different color than the coating and the coating is a relatively thin one, the coating may be removed from the tops of the particles by suitable means to produce a contrasting effect.

Where the base is one of a fibre-Portland cement composition I may, in order to secure to the product the advantages of my composition, apply a surface layer 14 which may also be a veneer, over any portion of such base as may be desired. This may be done while the base is still plastic or may be applied to a fully hardened one.

In order to obtain an additional roughened texture and an exceedingly hard weather-wear surface and to enable the saving of color ingredients, I further propose to apply high alumina cement 16 in a dry state which may include dry extending materials, for instance, marble dust, ground colors, etc., over the damp and/or plastic cement surface of the shingle. The application may be made by spraying, in which case a substantially rough texture will be obtained, or by rolling or dusting, and may be applied to any part of the elements thus treated. The layer may be applied to uncoated surfaces if such be previously properly wetted, or to coated bases or to the body of the base, if it be a fibre-cement one. While this may be done by a dusting or rolling process it is preferred that the dry cement, which may include aggregates of about 175 mesh and also coloring oxides where a color is desired, be forcibly impelled or sprayed upon the surface thus treated. An example of a suitable mix for white comprises:

| | Per cent |
|---|---|
| High alumina cement | 47.5 |
| Marble dust 175 mesh | 47.5 |
| Titanium oxide | 5 |

It is preferred that the dry mix be applied until the treated surface has the appearance of dryness. By this method a harder and less porous facing may be obtained, and where the surface is a highly textured one of many high and low areas the dry composition absorbs the excess water that may exist in the low areas and which would ordinarily result in a softer coating at these points, and provides them with wearing faces of equal character to the other portion of the surface. Mottled surface effects may be obtained by positioning the spray about 3" from the surface covered, for at substantially such a distance more water is brought to the surface where the air pressure is greatest and more intense color is thus produced. More uniform effects are obtained by spraying at greater distances, for instance, about 10". In either case, for the examples given a satisfactory pressure to use is about 70 to 80 lbs. per sq. in. As a final operation where a dry composition is applied to an unset cement surface, a mist of water may be conveyed to the dry material to dampen the cementitious ingredient to aid in proper hydration. In this manner a dull finish may be obtained. Thorough wetting of the dry particles in contrast will effect glossy spots. In using this process for producing white surfaces where the cementitious base contains asphalt, I have found it desirable to omit the final water application in order to lessen the tendency of staining the cement when the shingles are stacked with the asphalt back or rear side of one shingle adjacent the cementitious facing or front side of another. The dry cement particles are not conducive to floating the oils of the asphalt base of the adjacent shingle. In this case, however, the water of hydration for the dry pulverulent layer is provided by the under plastic cement coating which has included therein sufficient water to effect the hydration of the surface. The shingles thus produced in any of the forms described will have a cementitious surfacing highly resistant to wear upon exposure, substantially entirely free of self-staining or discoloration, resistant to acids and in certain forms penetratable by driven fastening means 18 without fracture or breakdown of the surface. Such shingles may be thick to obtain heavy butt effects when exposed or may be thin so that they possess pliable characteristics in one direction if the base be a fibrous one, or if the shingling material be of the form of Figure 2 that the composition provides the product with a substantial degree of flexibility. The units may be formed to various shapes of which the shingle 20 of Fig. 7 is an example, and in the form disclosed in this figure where the shingle is a thin one, I may take advantage of its flexible characteristics to obtain a spring bow effect upon the surface when laid and in this manner to obtain a better weather seal. The shingle 13 may be laid as in Fig. 1 in overlapping courses and secured in such positions as desired by fastening means, which may be hooks, nails or pins, and such means may, where desired, pass through more than two layers of material. Where the structure includes a skin asphalt backing layer 22, this layer will in assembly seal to the cementitious facing of an underlying shingle in an adjacent course and due to the character of the cement composition no deteriorating acid action will be effected.

From a consideration of the foregoing description of my invention it can be readily seen that the composition of my invention is productive of many improved products, without increase in cost. It is also evident that many changes may be made in the shingles herein described and in the process of making same. It is therefore desired that the invention be construed including equivalents and as broadly as the claims, taken in conjunction with the prior art, may allow.

I claim:

1. Process of preparing roofing and siding comprising forming fibrous base material, treating said base material with bitumen, coating said treated base with a water-repellent adhesive and bonding surface roughening material thereto before the adhesive has set, preparing a plastic cement composition comprising a small amount of calcium sulphate and a high alumina material containing principally calcium aluminates and calcium alumina ferrites and substantially free of free lime, dividing and coating said base with the plastic cement composition, arranging a plurality of the divided and coated bases as a compact grouping with adjacent pieces in face to face relation and before the plastic coatings have set, and curing the coated material.

2. Process of making shingling material comprising forming a base mixture comprising a fibre-cement composition saturated with a water-repellent agglutinant, forming said base composition into thin shingle elements, applying thereto a surfacing comprising a high alumina cement, arranging a plurality of the coated bases as a compact grouping with adjacent elements in face to face relation and before the cementitious coating has set and curing the coated material, said water-repellent agglutinant serving as a separating medium between elements during curing thereof.

3. Process of preparing mottled surfaced building material comprising forming a base having a wet plastic facing comprising hydraulic cement and water, impelling into said wet facing a dry composition of a substantially uniform color effect comprising hydraulic cement and forcibly impelling said dry composition from a position about three inches from the wet facing and under a directive force of about 70 to 80 pounds per square inch.

4. Process of preparing uniformly surfaced building material comprising the process as claimed in claim 3, wherein the dry composition is impelled from a distance of about 10 inches.

5. Process of preparing white cement surfaced building material comprising forming base material having a front side and a rear side, said rear side having a bituminous facing, applying to said front side a wet facing comprising a white composition comprising hydraulic cement, forcibly impelling against said facing a white composition comprising dry hydraulic cement and including in said wet facing sufficient liquid to effect proper hydration of the dry composition, arranging the material in a compact grouping of layers, with the bituminous face of one layer against the cementitious face of the next and curing said coated material, said dry cement application inhibiting flotation of the bitumen oils and substantially preventing staining of the white cementitious faces.

6. Process of preparing roofing and siding without producing objectionable efflorescence, comprising forming fibrous base material, coating said base material with a water-repellent adhesive, securing a surface roughening material to said adhesive before it has set, preparing a plastic cement composition comprising a high alumina material containing principally calcium aluminates and calcium alumina ferrites and substantially free of free lime, coating said base material with the plastic cement composition, compactly arranging a plurality of layers of the coated material with the sides of said layers facing each other, and while the coating is still plastic, and curing the coated material, said coating being adapted to cure without producing objectionable efflorescence.

7. Process of preparing roofing and siding material comprising forming a base comprising thermoplastic material, applying to said base a mixture comprising water and a high alumina cement containing principally calcium aluminates or calcium alumina ferrites, and applying said mixture before said cement has fully set; said cement having a substantial temperature rise in reaction with said water, and sufficient to soften said thermoplastic material sufficiently to permit adjustment of stresses between said base and cement layer.

NORMAN P. HARSHBERGER.